M. E. Stanger,
Shovel Plow.
No. 69,137. Patented Sep. 24, 1867.
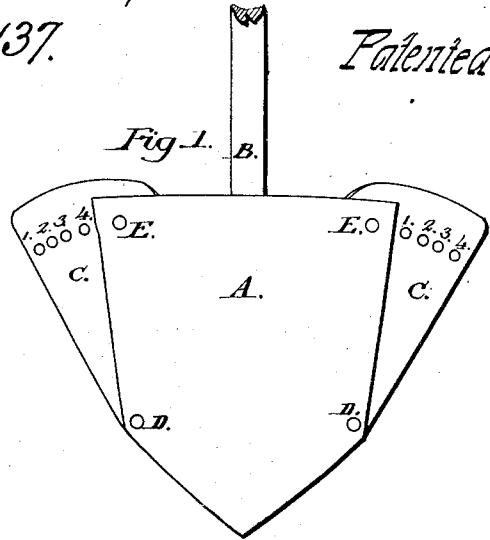
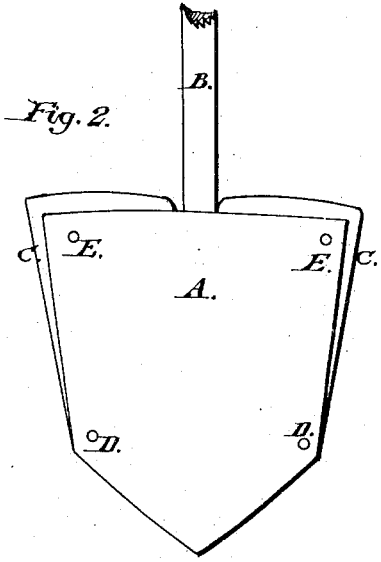
WITNESSES:
Charles Hoebel
D. D. Stanger
INVENTOR:
M. E. Stanger
By his attorneys
Geo. S. Chapin

United States Patent Office.

M. E. STANGER, OF WHEELING, ILLINOIS.

Letters Patent No. 69,137, dated September 24, 1867.

IMPROVEMENT IN SHOVEL-PLOUGH.

*The Schedule referred to in these Letters Patent and making part of the same.*

TO ALL WHOM IT MAY CONCERN:

Be it known that I, M. E. STANGER, of Wheeling, in the county of Cook, in the State of Illinois, have invented an improved Shovel-Plough; and I do hereby declare that the following is a full and exact description thereof, reference being had to the accompanying drawings, and to the letters of reference marked thereon, making a part of this specification, in which—

Figure 1 is an elevation of my shovel-plough with the wings extended.

Figure 2, an elevation of the same with wings closed.

The nature of my invention consists in attaching to the common shovel-plough two wings, by means of bolts or otherwise, and arranging said wings by means of a series of holes in them, and bolts put through the main shovel and said holes, so that the wings may be spread apart or closed together, as the case may require, for turning a simple furrow, or hilling corn, potatoes, &c. This arrangement differs from any now in use in the following particulars: first, the wings are jointed to the main shovel at such points as will give them cutting edges corresponding with the sharp edge of the main shovel, whether extended or closed.

In order to give a correct understanding of my invention, I have marked corresponding parts with similar letters, and will now give a detailed description.

A represents the common shovel-plough used in stirring the earth between the rows of corn or other vegetables. I attach to this shovel two wings, C C, by means of joints or bolts D D. Said wings are made of the same material as the main shovel A, and have a series of holes, 1, 2, 3, 4, &c., made through them, as the case may require, and may be held in position by means of bolts E, figs. 1 and 2, put through shovel A, and either of the holes 1, 2, 3, 4, &c., accordingly as the width of the furrow to be turned, or the hilling process may require. This arrangement differs from the slotted weed-turners now in use from the fact that the cutting edge of the shovel is continued the entire length of the wings, they being arranged to present a continuous side cutting edge corresponding with the height of the principal shovel, as shown.

I know that weed-turners (having slots) have been used in connection with the top of shovel A; but as they scrape the surface only, and have no effect in the matter of hilling corn or other vegetables, I claim that the adjustable wings capable of turning furrows wide or narrow, according to the distance between the rows, is new, and possesses an advantage which is both practical and of great importance, and not only provides means for turning furrows of different widths, but without changing ploughs, as is now the case.

Having thus fully described my invention, what I claim, is—

A shovel-plough having wings C C jointed to it, and arranged by means of a series of holes, 1, 2, 3, 4, &c., for turning a wide or narrow furrow, substantially as set forth.

M. E. STANGER.

Witnesses:
CHARLES KOCHEL,
D. D. STANGER.